United States Patent
Kang et al.

(10) Patent No.: US 7,739,027 B2
(45) Date of Patent: Jun. 15, 2010

(54) METHOD AND APPARATUS FOR MONITORING AN EGR VALVE IN AN INTERNAL COMBUSTION ENGINE

(75) Inventors: Jun-Mo Kang, Ann Arbor, MI (US); Chen-Fang Chang, Troy, MI (US); Allen B. Rayl, Waterford, MI (US); Vijay Ramappan, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 318 days.

(21) Appl. No.: 12/046,173

(22) Filed: Mar. 11, 2008

(65) Prior Publication Data

US 2009/0048765 A1 Feb. 19, 2009

Related U.S. Application Data

(60) Provisional application No. 60/956,398, filed on Aug. 17, 2007.

(51) Int. Cl.
*G06F 19/00* (2006.01)
*F02M 25/07* (2006.01)
*F02B 47/08* (2006.01)
*G01M 15/00* (2006.01)

(52) U.S. Cl. .................. 701/108; 701/114; 123/568.16; 73/114.74

(58) Field of Classification Search ............ 123/568.11, 123/568.16, 568.31; 701/108, 114; 73/114.31–114.33, 73/114.74; 60/605.2
See application file for complete search history.

(56) References Cited

U.S. PATENT DOCUMENTS

| | | | | |
|---|---|---|---|---|
| 6,035,835 A | * | 3/2000 | Shigihama et al. | 123/568.16 |
| 6,128,902 A | | 10/2000 | Kolmanovsky et al. | |
| 6,182,645 B1 | * | 2/2001 | Tsuchiya | 123/568.23 |
| 6,390,077 B1 | * | 5/2002 | Simpson et al. | 123/568.16 |
| 6,837,227 B2 | | 8/2002 | Jaliwala et al. | |
| 6,615,812 B2 | * | 9/2003 | Wild et al. | 123/568.21 |
| 6,732,522 B2 | | 10/2003 | Wright et al. | |
| 6,651,492 B2 | * | 11/2003 | Kolmanovsky et al. | 73/114.42 |
| 6,687,601 B2 | * | 2/2004 | Bale et al. | 701/108 |
| 6,941,936 B2 | * | 9/2005 | Yasui et al. | 123/690 |
| 7,398,149 B2 | * | 7/2008 | Ueno et al. | 701/108 |
| 2003/0029233 A1 | | 2/2003 | Ting et al. | |
| 2003/0075158 A1 | * | 4/2003 | Milos et al. | 123/568.21 |
| 2009/0048761 A1 | | 2/2009 | Kang et al. | |

FOREIGN PATENT DOCUMENTS

| | | | |
|---|---|---|---|
| EP | 964141 A2 | * | 12/1999 |
| JP | 2000220510 A | * | 8/2000 |
| JP | 2002349357 A | * | 12/2002 |

* cited by examiner

*Primary Examiner*—Willis R Wolfe, Jr.

(57) ABSTRACT

An internal combustion engine is selectively operative in a spark ignition combustion mode and a controlled auto-ignition combustion mode. An EGR valve operative to control flow of exhaust gas to an intake manifold is monitored, including commanding the EGR valve to a closed position and monitoring operation of the internal combustion engine. An intake manifold pressure due to a fresh air charge is estimated based upon the operation of the engine. The intake manifold pressure is measured, and the estimated intake manifold pressure is compared to the measured intake manifold pressure.

18 Claims, 2 Drawing Sheets

METHOD AND APPARATUS FOR MONITORING AN EGR VALVE IN AN INTERNAL COMBUSTION ENGINE

CROSS REFERENCE TO RELATED APPLICATIONS

This application claims priority from U.S. Provisional Application No. 60/956,398, filed on Aug. 17, 2007, which is hereby incorporated herein by reference.

TECHNICAL FIELD

This disclosure relates to operation and control of internal combustion engines, and more specifically to homogeneous-charge compression-ignition ('HCCI') engines.

BACKGROUND

The statements in this section merely provide background information related to the present disclosure and may not constitute prior art.

Known spark ignition engines introduce a fuel/air mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both spark ignition engines and compression ignition engines involves premixed or diffusion flames controlled by fluid mechanics.

An engine configured for spark ignition combustion can be adapted to operate in a homogeneous charge compression ignition (hereafter 'HCCI') combustion mode, also referred to as a controlled auto-ignition combustion mode, under predetermined speed/load operating conditions. The HCCI combustion mode comprises a distributed, flameless, auto-ignition combustion process that is controlled by oxidation chemistry. An engine operating in the HCCI mode has an intake charge that is preferably homogeneous in composition, temperature, and residual exhaust gases at intake valve closing time. Controlled auto-ignition combustion is a distributed kinetically-controlled combustion process with the engine operating at a dilute fuel/air mixture, i.e., lean of a fuel/air stoichiometric point, with relatively low peak combustion temperatures, resulting in low $NO_x$ emissions. The homogeneous fuel/air mixture minimizes occurrences of rich zones that form smoke and particulate emissions.

When an engine operates in the HCCI combustion mode, the engine control comprises lean air/fuel ratio operation with the throttle wide open to minimize engine pumping losses. Air flow into the engine can be controlled by controlling opening and closing of engine intake and exhaust valves, including controlling phasing and lift of opening and closing thereof. When the engine operates in the spark ignition combustion mode, the engine control can comprise stoichiometric air/fuel ratio operation, with the throttle valve controlled over a range of positions from 0% to 100% of the wide-open position to control intake air flow to achieve the stoichiometric air/fuel ratio.

SUMMARY

An internal combustion engine includes an intake manifold, devices operative to control openings and closings of intake and exhaust valves and an exhaust gas recirculation valve operative to control flow of exhaust gas to the intake manifold. The exhaust gas recirculation valve is monitored by commanding the EGR valve to a closed position, monitoring operation of the internal combustion engine, estimating a partial intake manifold pressure due to a fresh air charge based upon the operation of the internal combustion engine, measuring the intake manifold pressure, and comparing the estimated partial intake manifold pressure due to a fresh air charge to the measured intake manifold pressure.

BRIEF DESCRIPTION OF THE DRAWINGS

One or more embodiments will now be described, by way of example, with reference to the accompanying drawings, in which.

DETAILED DESCRIPTION

Figure 1:
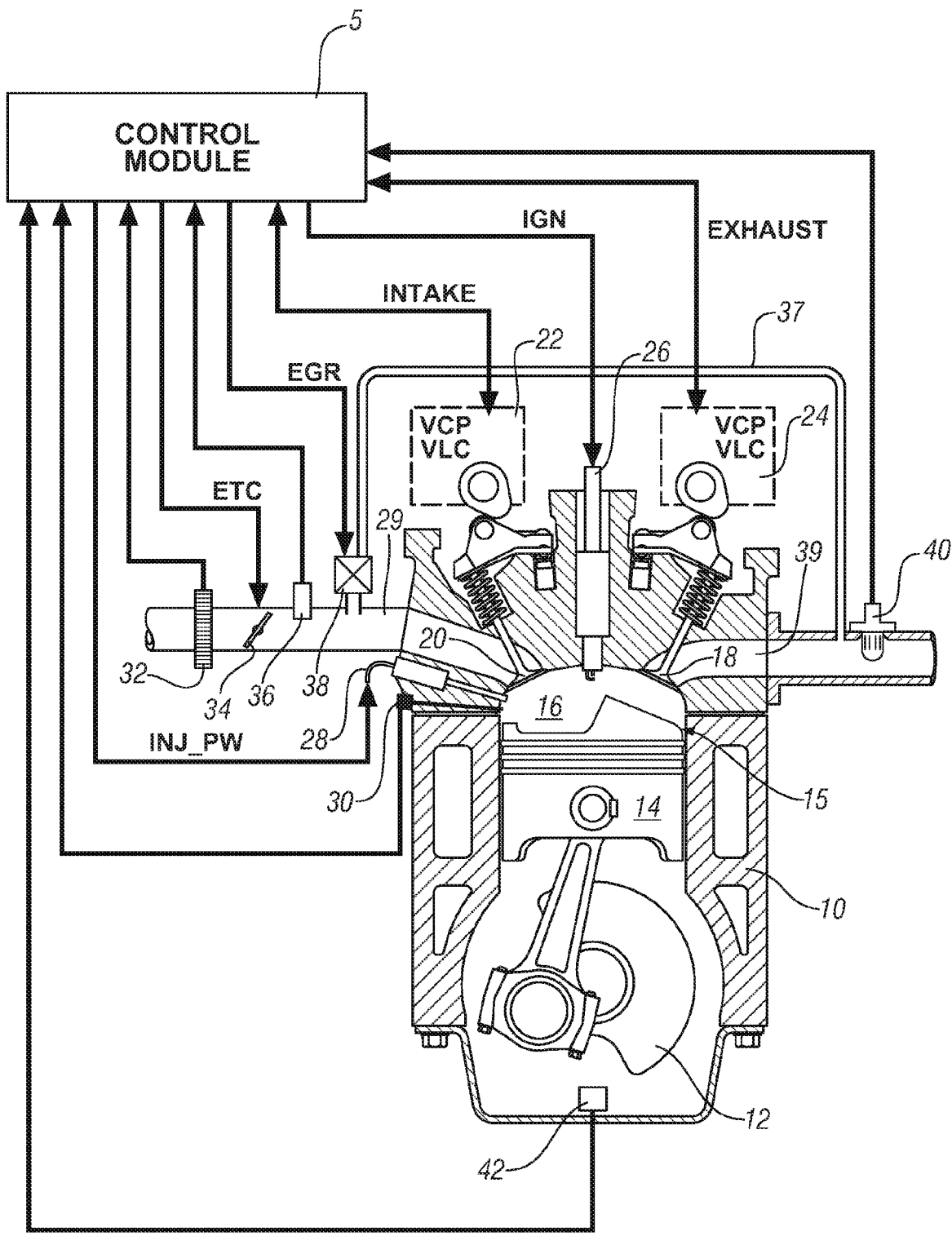
FIG. 1 is a schematic drawing of an engine system in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 ('CONTROL MODULE') that have been constructed in accordance with an embodiment of the disclosure. The engine 10 is selectively operative in a controlled auto-ignition combustion mode and a spark ignition combustion mode. The engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system comprises air flow ductwork and devices for monitoring and controlling the air flow. The devices preferably include a mass air flow sensor 32 for monitoring mass air flow and intake air temperature. A throttle valve 34, preferably comprising an electronically controlled device, controls air flow to the engine 10 in response to a control signal ('ETC') from the control module 5. A manifold pressure sensor 36 monitors manifold absolute pressure and barometric pressure in the intake manifold 29. An external flow passage 37 having a flow control valve 38 can recirculate residual exhaust gases from an exhaust manifold 39 to the intake manifold 29. The flow control valve 38 is referred to hereinafter as an EGR valve 38 (for 'exhaust gas recirculation'). The control module 5 preferably controls mass flow of recirculated exhaust gas to the intake manifold 29 by controlling magnitude of opening of the EGR valve 38.

Air flow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. Openings and closings of the intake and exhaust valves 20 and 18 are preferably controlled with a dual camshaft (as depicted), the rotations of which are linked and indexed with rotation of the crankshaft 12. A VCP/VLC device 22 preferably comprises a controllable mechanism operative to variably control valve lift ('VLC') and variably control cam phasing ('VCP') of the intake valve(s) 20 for each cylinder 15 in response to a control signal ('INTAKE') from the control module 5. A VCP/VLC device 24 preferably comprises a controllable mechanism operative to variably control valve lift ('VLC') and variably control phasing ('VCP') of the exhaust valve(s) 18 for each cylinder 15 in response to a control signal ('EXHAUST') from the control module 5. The VCP/VLC devices 22 and 24 each preferably include a controllable two-step valve lift mechanism operative to control magnitude of valve lift, or opening, of the intake and exhaust valve(s) 20 and 18 to one of two discrete steps. The two discrete steps preferably include a low-lift valve open position (about 4-6 mm) for load speed, low load operation, and a high-lift valve open position (about 8-10 mm) for high speed and high load operation. The VCP/VLC devices 22 and 24 preferably include variable cam phasing mechanisms to control phasing (i.e., relative timing) of opening and closing of the intake valve(s) 20 and the exhaust valve(s) 18 respectively. The phasing refers to shifting opening times of the intake and exhaust valve(s) 20 and 18 relative to positions of the crankshaft 12 and the piston 14 in the respective cylinder 15. The variable cam phasing systems of the VCP/VLC devices 22 and 24 preferably have a range of phasing authority of about 60°-90° of crank rotation, thus permitting the control module 5 to advance or retard opening and closing of one of intake and exhaust valve(s) 20 and 18 relative to position of the pistons 14 for each cylinder 15. The range of phasing authority is defined and limited by the VCP/VLC devices 22 and 24. The VCP/VLC devices 22 and 24 include camshaft position sensors (not shown) to determine rotational positions of the intake and the exhaust camshafts (not shown). The VCP/VLC devices 22 and 24 are actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into the combustion chamber 16, in response to a control signal ('INJ_PW') from the control module 5. As used herein, fueling refers to a mass fuel flow into one of the combustion chambers 16. The fuel injectors 28 are supplied pressurized fuel from a fuel distribution system (not shown).

The engine 10 includes a spark ignition system by which spark energy is provided to a spark plug 26 for igniting or assisting in igniting cylinder charges in each combustion chamber 16 in response to a control signal ('IGN') from the control module 5. The spark plug 26 enhances control of combustion timing in each cylinder 15 of the engine 10 at certain conditions, e.g., during cold start and near a low load operation limit.

The engine 10 is equipped with various sensing devices for monitoring engine operation, including a crank sensor 42 operative to monitor crankshaft rotational position, i.e., crank angle and speed, a wide range air/fuel ratio sensor 40 adapted to monitor air/fuel ratio in the exhaust gas feedstream, and a combustion sensor 30 adapted to monitor in-cylinder combustion in real-time during ongoing operation of the engine 10. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (hereafter 'IMEP') for each cylinder 15 for each combustion cycle. Alternatively, other sensing systems can be used to monitor real-time in-cylinder combustion parameters which can be translated into combustion phasing, e.g., ion-sense ignition systems and non-intrusive cylinder pressure monitoring systems.

During operation in the controlled auto-ignition combustion mode, the engine 10 operates at wide open throttle on gasoline or other fuel blends over an extended range of engine speeds and loads. The engine 10 operates in the spark ignition combustion mode with a controlled throttle operation under conditions not conducive to the controlled auto-ignition combustion mode operation, and to achieve engine power to meet an operator torque request. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present disclosure.

The control module 5 preferably comprises a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital conversion circuitry and digital to analog circuitry, and input/output circuitry and devices, and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

Figure 2:
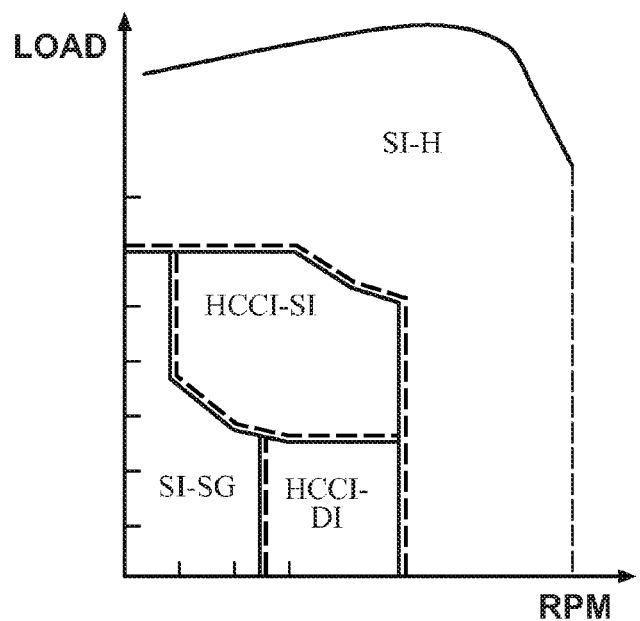
FIG. 2 is a data graph in accordance with the present disclosure.

FIG. 2 schematically depicts preferred operating ranges for the exemplary engine 10 in spark ignition and controlled auto-ignition combustion modes, based upon states of engine parameters, in this embodiment comprising speed ('RPM') and load ('LOAD') which is derivable from engine parameters including the fuel flow and the intake manifold pressure. The engine combustion modes preferably comprise a spray-guided spark ignition ('SI-SG') combustion mode, a single injection controlled auto-ignition ('HCCI-ST') combustion mode, and double injection controlled auto-ignition ('HCCI-DI') combustion mode, and a homogeneous spark ignition ('SI-H') combustion mode. A preferred speed and load operating range for each of the combustion modes is based upon engine operating parameters, including combustion stability, fuel consumption, emissions, engine torque output, and others. Boundaries which define the preferred speed and load operating ranges to delineate operation in the aforementioned combustion modes are preferably precalibrated and stored in the control module 5.

The engine 10 is controlled to operate at a preferred air-fuel ratio for optimal performance, and the intake air flow is controlled to achieve the preferred air-fuel ratio. This includes estimating a cylinder air charge based upon engine operation in the selected combustion mode. The throttle valve 34 and VCP/VLC devices 22 and 24 are controlled to achieve an intake air flowrate based upon the estimated cylinder air charge, including during a transition between the spark ignition and controlled auto-ignition combustion modes. Air flow is controlled by adjusting the throttle valve 34 controlling VCP/VLC devices 22 and 24 to control the opening timing and profiles of the intake and exhaust valve(s) 20 and 18. Operation in the two combustion modes requires different settings for the VCP/VLC devices 22 and 24 in terms of valve timing and profiles of the intake and exhaust valve(s) 20 and 18 and the throttle valve 34 for throttle position. By way of example, the throttle valve 34 is preferably wide-open in the auto-ignited combustion mode with the engine 10 controlled at a lean air-fuel ratio, whereas the throttle valve 34 is controlled to regulate the air flow and the engine 10 is controlled to a stoichiometric air-fuel ratio in the spark-ignited combustion mode.

Figure 3:
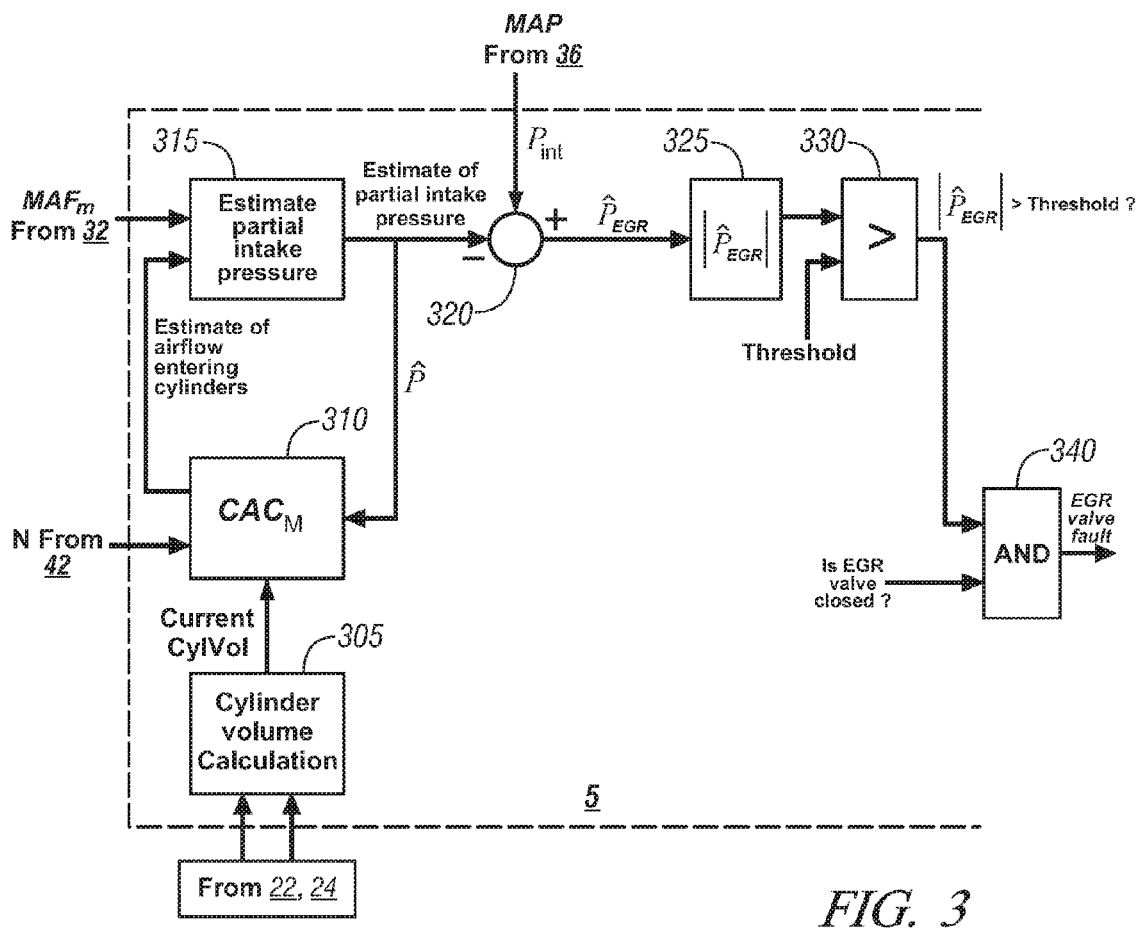
FIG. 3 is a schematic block diagram of a control scheme in accordance with the present disclosure.

FIG. 3 depicts a control strategy for operating the engine 10 described with reference to FIGS. 1 and 2, which is executed in the control module 5. The control strategy includes monitoring input signals from the mass air flow sensor 32, the crank sensor 42, the manifold pressure sensor 36, and the VCP/VLC devices 22 and 24. When the EGR valve 38 is commanded to a closed position, operation of the engine 10 is monitored. The intake manifold pressure is estimated based upon the operation of the engine 10, and the intake manifold pressure is concurrently measured using the manifold pressure sensor 36. The estimated intake manifold pressure is compared to the measured intake manifold pressure. The control module 5 detects a fault in the EGR valve 38 when a difference between the estimated intake manifold pressure and the measured intake manifold pressure exceeds a precalibrated threshold.

The control strategy of the control module 5 includes a cylinder air charge estimator ('$CAC_M$') 310, which estimates air flow entering the cylinders 15. The cylinder air charge estimator 310 includes effects of operation of the VLC/VCP devices 22 and 24 on the intake air flow. A partial pressure p of the intake manifold 29 due to a fresh air charge can be modeled by the following Eq. 1:

$$\frac{d}{dt}p = \frac{RT}{V}(MAF - CAC(CylVol, N, p)) \quad (1)$$

wherein T is the intake manifold temperature measured at the mass air flow sensor 32, R is the gas constant, V is the volume of the intake manifold 29, MAF is the mass air flow entering through the throttle valve 34 measured by the mass air flow sensor 32, and CAC is the cylinder air charge, comprising the mass air flow entering the cylinders 15. The cylinder air charge is a function of cylinder volume (CylVol), engine speed (N), and the partial pressure p of the intake manifold due to the fresh air charge. The cylinder volume, i.e., the volumetric displacement, can be determined based upon the timings and profiles of the intake and exhaust valves 20 and 18, and is approximately equal to $V_{IVC}-V_{EVC}$ where $V_{IVC}$ and $V_{EVC}$ represent the cylinder volumes at closings of the intake valve 20 and the exhaust valve 18, respectively. The cylinder volumes can be calculated at the closings of the intake valve and exhaust valve 20 and 18 based upon inputs from the crank sensor 42 and camshaft position sensors (not shown) that are elements of the VCP/VLC devices 22 and 24. The cylinder volumes are calculated using known slider equations (305).

The mass air flow entering through the throttle valve 34 is measured by the mass air flow sensor 32. Dynamics of the mass air flow sensor 32 can be approximated by a first order differential equation in Eq. 2:

$$\tau \frac{d}{dt}MAF_m + MAF_m = MAF \quad (2)$$

wherein $\tau$ is the time constant of the mass air flow sensor 32 and $MAF_m$ is the measured mass air flow from the mass air flow sensor 32.

Combining Eqs. 1 and 2 and introducing a new parameter x yields Eq. 3:

$$x = p - \frac{RT}{V}\tau MAF_m \quad (3)$$

The following equation 4 is derived based upon the above equations:

$$\frac{d}{dt}x = \frac{RT}{V}\left(MAF_m - CAC\left(CylVol, N, x + \frac{RT}{V}\tau MAF_m\right)\right) \quad (4)$$

The cylinder air charge is preferably determined using the cylinder air charge estimator 310. The cylinder air charge estimator 310 approximates the cylinder air charge used in Eq. 4 and estimates the air flow entering the cylinders 15 in the following Eqs. 5, 6, and 7:

$$\frac{d}{dt}\hat{x} = \frac{RT}{V}\left(MAF_m - CAC_M\left(CylVol, N, \hat{x} + \frac{RT}{V}\tau MAF_m\right)\right) \quad (5)$$

$$\hat{p} = \hat{x} + \frac{RT}{V}\tau MAF_m \quad (6)$$

$$CAC_{EST} = CAC_M\left(CylVol, N, \hat{x} + \frac{RT}{V}\tau MAF_m\right) \quad (7)$$

wherein $\hat{x}$ is an estimate of x, $CAC_{EST}$ comprises an estimate of the cylinder air charge entering the cylinders 15, $CAC_M$ is the model of mass air flow entering the cylinders 15, and $\hat{p}$ is the estimated partial pressure in the intake manifold 29 due to the fresh air charge (315). In steady state operation, the estimated cylinder air charge $CAC_{EST}$ (or $CAC_M$) is equal to the cylinder air charge, or the measured mass air flow. Operation of the EGR valve 38 is monitored, including monitoring to determine presence of a fault. This includes estimating the intake manifold pressure based upon the operation of the engine 10 when the EGR valve 38 is commanded to the closed position. The manifold pressure sensor 36 directly monitors the intake manifold pressure. The estimated intake manifold pressure is compared to the measured intake manifold pressure.

A fault in the EGR valve 38 causes an error or difference between the estimated partial pressure $\hat{p}$ of the intake manifold 29 due to the fresh air charge and the actual pressure p of the intake manifold 29 when the EGR valve 38 has been commanded to close (320). The measured intake manifold pressure from the manifold pressure sensor 36 is substantially equal to the actual partial pressure p in the intake manifold 29 due to the fresh air charge when the EGR valve 38 is closed.

By way of example, a partial pressure due to external EGR flow through the EGR valve 38 can be approximated by the following Eq. 8:

$$\hat{p}_{EGR} = p_{int} - \hat{p} \quad (8)$$

wherein $p_{int}$ represents the intake manifold pressure measured with the manifold pressure sensor 36, $\hat{p}$ is the estimated partial pressure in the intake manifold 29 due to the fresh air charge, and $\hat{p}_{EGR}$ is the estimated partial pressure in the intake manifold 29 due to the EGR charge (325). Thus, when the EGR valve 38 is closed, the estimated partial pressure in the intake manifold 29 due to the EGR charge is compared to a predetermined threshold (330). When an absolute value of the estimated partial pressure in the intake manifold 29 due to the EGR charge is greater than the threshold and the EGR valve 38 has been commanded closed, it is determined that there is a fault in the EGR valve 38.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring an EGR valve operative to control flow of exhaust gas to an intake manifold of an internal combustion engine including devices operative to control openings and closings of intake and exhaust valves, comprising:
   commanding the EGR valve to a closed position;
   monitoring operation of the internal combustion engine;
   estimating a partial intake manifold pressure due to a fresh air charge based upon the operation of the internal combustion engine;
   measuring the intake manifold pressure; and
   comparing the estimated partial intake manifold pressure due to a fresh air charge to the measured intake manifold pressure.

2. The method of claim 1, further comprising the internal combustion engine including devices operative to control one of phasing and lift of the openings and closings of the intake and exhaust valves.

3. The method of claim 1, further comprising determining an EGR partial intake manifold pressure based upon a difference between the estimated partial intake manifold pressure due to the fresh air charge and the measured intake manifold pressure.

4. The method of claim 3, further comprising detecting a fault in the EGR valve when the EGR partial intake manifold pressure exceeds a threshold.

5. The method of claim 1, further comprising:
   monitoring closings of the intake and exhaust valves;
   determining a cylinder volumetric displacement based upon the closings of the intake and exhaust valves; and
   estimating the partial intake manifold pressure due to the fresh air charge based upon the cylinder volumetric displacement.

6. The method of claim 5, further comprising
   monitoring intake mass air flow, and
   estimating the partial intake manifold pressure due to the fresh air charge based upon the cylinder volumetric displacement and the intake mass air flow.

7. Method for monitoring an EGR valve of an internal combustion engine including devices operative to control openings and closings of intake and exhaust valves, comprising:
   commanding the EGR valve to a predetermined position;
   monitoring operation of the engine;
   determining an EGR partial intake manifold pressure due to flow through the EGR valve; and
   detecting a fault when the EGR partial intake manifold pressure due to flow through the EGR valve exceeds a threshold.

8. The method of claim 7, comprising:
   monitoring closings of the intake and exhaust valves;
   determining a cylinder volumetric displacement based upon the closings of the intake and exhaust valves;
   estimating a partial intake manifold pressure due to flow through the EGR valve based upon the cylinder volumetric displacement;
   monitoring intake manifold pressure, and
   determining the EGR partial intake manifold pressure based upon a difference between the monitored intake manifold pressure and the estimated partial intake manifold pressure.

9. The method of claim 7, further comprising commanding the EGR valve to a closed position and detecting a fault in one of the EGR valve and an external flow passage when the EGR partial intake manifold pressure due to flow through the EGR valve exceeds a threshold.

10. The method of claim 7, further comprising commanding the EGR valve to an opened position and detecting a fault in an external flow passage when the EGR partial intake manifold pressure due to flow through the EGR valve exceeds a threshold.

11. Method for detecting a fault in a flow control valve operative to externally recirculate exhaust gas to an intake manifold of an internal combustion engine, comprising:
   equipping the internal combustion engine with devices operative to control openings and closings of intake and exhaust valves;
   commanding the flow control valve to a closed position;
   monitoring operation of the internal combustion engine;
   estimating an intake manifold pressure due to a fresh air charge based upon the operation of the internal combustion engine;
   measuring the intake manifold pressure; and
   comparing the estimated intake manifold pressure due to the fresh air charge to the measured intake manifold pressure.

12. The method of claim 11, further comprising:
   monitoring closings of the intake and exhaust valves;
   determining a cylinder volumetric displacement based upon the closings of the intake and exhaust valves; and
   estimating the intake manifold pressure due to the fresh air charge based upon the cylinder volumetric displacement.

13. The method of claim 11, further comprising
   monitoring intake mass air flow, and
   estimating the intake manifold pressure due to the fresh air charge based upon the cylinder volumetric displacement and the intake mass air flow.

14. The method of claim 11, further comprising detecting a fault in the flow control valve when a difference between the estimated intake manifold pressure and the measured intake manifold pressure exceeds a threshold.

15. The method of claim 11, further comprising determining a recirculated exhaust gas partial intake manifold pressure based upon a difference between the estimated intake manifold pressure due to the fresh air charge and the measured intake manifold pressure.

16. The method of claim 15, further comprising:
monitoring closings of the intake and exhaust valves;
determining a cylinder volumetric displacement based upon the closings of the intake and exhaust valves; and
estimating the intake manifold pressure due to the fresh air charge based upon the cylinder volumetric displacement.

17. The method of claim 16, further comprising
monitoring intake mass air flow, and
estimating the intake manifold pressure due to the fresh air charge based upon the cylinder volumetric displacement and the intake mass air flow.

18. The method of claim 17, further comprising detecting a fault in the flow control valve when a difference between the estimated intake manifold pressure and the measured intake manifold pressure exceeds a threshold.

* * * * *